United States Patent
Huber

(10) Patent No.: US 6,178,144 B1
(45) Date of Patent: Jan. 23, 2001

(54) MAGNETO-OPTICAL RECORDING SYSTEM EMPLOYING LINEAR RECORDING AND PLAYBACK CHANNELS

(75) Inventor: William D. Huber, San Jose, CA (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/324,616

(22) Filed: Jun. 2, 1999

Related U.S. Application Data

(60) Provisional application No. 60/087,628, filed on Jun. 2, 1998.

(51) Int. Cl.$^7$ ............... G11B 11/00; G11B 5/03
(52) U.S. Cl. ............ 369/13; 369/124.04; 360/46
(58) Field of Search ............... 369/13, 124.01, 369/59, 47, 48, 54, 32, 124.02, 124.03, 124.04; 360/39, 65, 55, 66, 46, 29, 77.01

(56) References Cited

U.S. PATENT DOCUMENTS

| | | | |
|---|---|---|---|
| 2,292,387 | 8/1942 | Markey et al. | 250/2 |
| 4,202,017 | 5/1980 | Geffon et al. | 360/45 |
| 4,965,873 | 10/1990 | White | 360/41 |
| 5,124,861 | 6/1992 | Shimotashiro et al. | 360/39 |
| 5,319,502 | * 6/1994 | Feig | 360/46 |
| 5,475,672 | 12/1995 | Le Carvennec | 369/275.3 |

FOREIGN PATENT DOCUMENTS

| | | |
|---|---|---|
| 0 051 343 | 5/1982 | (EP) . |
| 0 139 925 | 5/1985 | (EP) . |
| 0 522 543 | 1/1993 | (EP) . |
| 0 631 280 | 12/1994 | (EP) . |
| 7-220317 | 8/1985 | (JP) . |
| 62-049781 | 3/1987 | (JP) . |
| 6-195786 | 7/1994 | (JP) . |
| 7-029239 | 1/1995 | (JP) . |
| 1 569 876 | 6/1990 | (SU) . |

OTHER PUBLICATIONS

Anonymous: "Maximizing the Output from Buried Servo by Servo Write Current Shaping", IBM Technical Disclosure Bulletin, vol. 24, No. 3, Aug. 1981, pp. 1479–1480.

"AC–Bias Magnetic Recording of Data", IBM Technical Disclosure Bulletin, vol. 32, No. 7, Dec. 1, 1989, pp. 286,288.

Huber, W. Don; Manuscript Entitled "Addendum: Efficient Linearization of Saturation Channel", dated Sep. 30, 1999; 1 page.

Seagate Technology, Inc. Confidential Interoffice Memorandum (with Attachments); To: Tom Murnan; From: Bruce Johnson; Dated Oct. 4, 1992; Subject: Frequency domain recording (FDR); 15 pp.

French, Catherine A., et al.; Article Entitled "Bounds on the Capacity of a Peak Power Constrained Gaussian Channel"; IEEE Transactions on Magnetics, vol. 24, No. 5, Sep. 1988; pp. 2247–2262.

Bertram, H. Neal; Article Entitled "Long Wavelength AC Bias Recording Theory"; IEEE Transactions on Magnetics, vol. Mag–10, No. 4, Dec. 1974; pp. 1039–1048.

Eiling, Aloys; Article Entitled "Computer Simulation of Bias Recording"; IEEE Transactions on Magnetics, vol. 24, No. 5, Sep. 1988; pp. 2235–2246.

Jacoby, George V.; Article Entitled "High Density Recording with Write Current Shaping" IEEE Transactions on Magnetics, vol. Mag–15, No. 3, Jul. 1979; pp. 1124–1130.

(List continued on next page.)

*Primary Examiner*—Ali Neyzari
(74) *Attorney, Agent, or Firm*—Flehr Hohbach Test Albritton & Herbert LLP

(57) ABSTRACT

A magneto-optical recording system achieves improved bandwidth efficiency using a modulated recording signal, recording channel linearization, and a MO medium having a low inter-granular exchange coupling and abrupt flux transitions.

5 Claims, 7 Drawing Sheets

OTHER PUBLICATIONS

McCown, Donald P., et al.; Article Entitled "Comparative Aspects of AC Bias Recording"; IEEE Transactions on Magnetics, vol. Mag–17, No. 6, Nov. 1981; pp. 3343–3345.

Mintzer, Fred, et al; Research Report Entitled "Experiments on the Use of FDDT for AC–Bias Disk Recording"; IBM Research Division; RC 9429 (#41644) Jun. 16, 1982; Communications/Engineering technology; 6 pp. and pp. 7–19.

Lin, Gang Herbert, et al.; Article Entitled "Transition Noise Spectral Measurements in Thin Film Media"; IEEE transactions on Magnetics, vol. 30, No. 6, Nov. 1994; pp. 3987–3989.

Letter to Don Huber dated Apr., 1997 including "The Hedy Lamarr patent saga in spread–spectrum communications" w/attachment, 9 pp.

Couey, Anna; Internet Article Entitled "Recognition At Last: Hedy Lamarr & George Antheil receive EFF Award" dated Jul. 1, 1998; 2 pp.; http://www.microtimes.com/166/cover-sidebar.html.

Couey, Anna; Internet Article Entitled "The Birth of Spread spectrum: How 'The Bad Boy of Music' And 'The Most Beautiful Girl in the World' Catalyzed a Wireless revolution–In 1941" dated Jul. 1, 1998; 6 pp.; http://www.microtimes.com/166/coverstory166.html.

Viterbi, Andrew J.; *CDMA Principles of Spread Spectrum Communication*; Addison–Wesley Longman, Inc., 1995; pp. vii—xi.

Article Entitled, "The Historian's Column"; IEEE Information Theory Society Newsletter; Dec. 1998; pp. 14 and 15.

Slaughter, T., Editor.; *Digital Communictions*; 1983; pp. 71–73.

Huber, W. Don; "A Signal Processing Advantage Associated With Magneto–Optical Data Channels"; Manuscript dated Apr. 1, 1997; 3 pp.

Sklar, Bernard; *Digital Communications: Fundamentals and Applications*; Prentice Hall, 1988, pp. 536–545.

Figure 25(b) re. Kerr Rotation and Magnetic Field; p. 126; and Definitions of Figures 24–30; p. 79.

Fu, Hong, et al.; Article Entitled "Dielectric tensor characterization and evaluation of several magneto–optical recording media"; J. appl. Phys. 78 (6), Sep. 15, 1995; pp. 4076, 4077, 4079, 4081, 4083, 4085, 4087 & 4089.

Huber, W. Don; Article Entitled "Maximal Areal Density for PRML Data Channels"; IEEE Transactions on Magnetics, vol. 32, No. 5, Sep. 8, 1996; pp. 3956–3958.

Webb, William, et al; *Modern Quadrature Amplitude Modulation: Principles and Applications for Fixed and Wireless Communications;* Pentech and IEEE Press; 9 Contents pages attached.

Weathers, Anthony D.; Dissertation Entitled "Modulation Techniques for Digital Magnetic Recording" for the University of California, San Diego; 1990; pp. 116–157.

Forney, Jr., G. David, et al.; Article Entitled "Combined Equalization and Coding Using Precoding"; IEEE Communications Magazine; Dec. 1991; pp. 25–34.

Kobayashi, M., et al.; Article Entitled "Beyond 1 $\mu m^2$/bit High Density Recording With Improved QAM Technique"; IEEE Transactions on Consumer Electronics, vol. 37, No. 3, Aug. 1991; pp. 283–290.

Wong, Bennett C.; Article Entitled "A 200–MHz All–Digital QAM Modulator and Demodulator in 1.2–$\mu m$ CMOS for Digital Radio Applications"; IEEE Journal of Solid–State Circuits, vol. 26, No. 12, Dec. 1991; pp. 1970–1980.

* cited by examiner

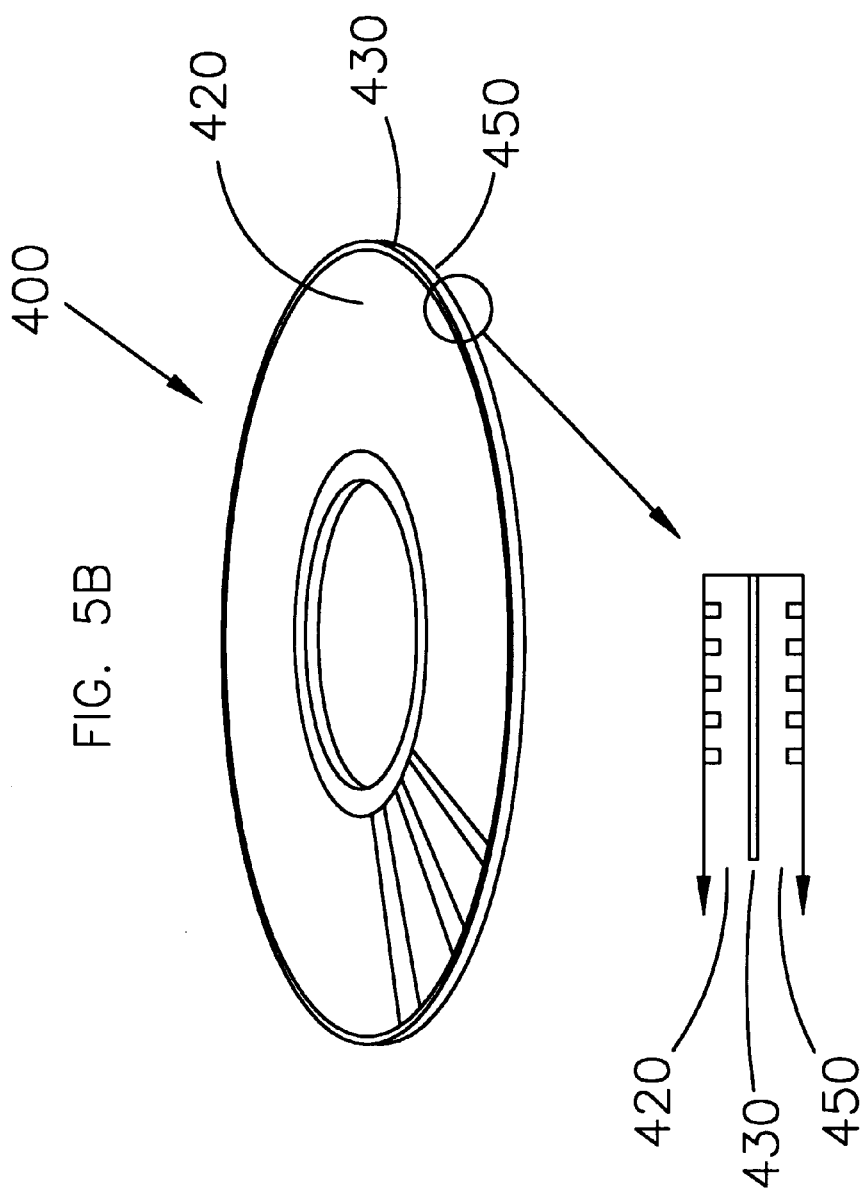

MAGNETO-OPTICAL RECORDING SYSTEM EMPLOYING LINEAR RECORDING AND PLAYBACK CHANNELS

CROSS-REFERENCE TO RELATED APPLICATIONS

The present application claims priority to Provisional Application No. 60/087,628 filed Jun. 2, 1998, which is incorporated herein by reference. This invention may be used in combination with the inventions disclosed in the U.S. Patent Application entitled "Efficient Linearization of Saturation Channels" by William D. Huber, Robert F. Smith, Terry A. Aultman and John C. Kuklewicz, and U.S. Patent Application entitled "Parallel Coded Spread Spectrum Communication for Data Storage" by William D. Huber, which are filed herewith and incorporated by reference.

FIELD OF THE INVENTION

This invention relates to digital recording systems, and more particularly to a magneto-optical digital recording system implementing linear recording and playback channels.

BACKGROUND OF THE INVENTION

Digital recording systems such as computer disk drives, audio recording/playback (DAT) systems, and video recording/playback (DVD) systems are well known. The majority of these systems use either magnetic recording or magneto-optical recording to store and retrieve data from the storage medium.

Magnetic recording (MR) systems use a magnetic medium (disk or tape) to store data. The magnetic medium contains surface ferro-magnetic particles, each having a magnetic polarity. During recording, the ferro-magnetic particles are exposed to a locally applied magnetic field. The particles become magnetized and the direction of each particle's polarity is used to represent a segment of the recorded signal. During playback, the medium is passed by a playback head which senses the direction of each particle, thereby reconstructing the originally stored data.

Magneto-optical (MO) recording is another system used to store to and retrieve data, common examples being audio and video CD systems. MO systems operate on substantially the same principle as MR systems, both using the direction of ferro-magnetic particles within a magnetic medium (disk or tape) to represent stored information. The MO medium is different from most MR media in that the ferro-magnetic particles within the medium are vertically oriented. MO systems also employ lasers to record and read data from the medium. Data is recorded onto the MO medium by laser heating the MO medium to its curie temperature point. Once the MO medium reaches it curie temperature point, the ferro-magnetic particles within the medium exhibit low coercivity and can be easily re-oriented in another direction when exposed to a magnetic field. A locally applied magnetic field orients particles in the desired direction, the direction corresponding to the data to be recorded. Once the illuminated area cools, the particles exhibit high coercivity and retain their direction even in the presence of strong magnetic fields.

Reading data from the MO medium is accomplished by again illuminating the ferro-magnetic particles with a laser, except at a lower power to avoid heating the medium. The property of the MO medium is such that the embedded particles shifts the polarization of the illuminating light. Surfaces of the MO medium are passed by the illuminating laser and the stored data therein causes a polarization shift in the reflected beam known as the Kerr effect. A detector seizes the changes in polarization and reconstructs the stored data.

The MO medium has greater storage density and retains data more reliably compared to the MR medium. Because the MO medium uses vertically oriented particles, MO media has a recording density typically 10 to 1,000 times greater than that of the MR medium. In addition, because MO systems use a laser to read data from the MO medium as opposed to a playback head, MO media lasts significantly longer than MR media (15–40 years versus 3 years). Further, since MO media is resistant to external magnetic fields at room temperature, data storage is more reliable using the MO "system compared to the MR systems.

The MO media also has a very unique beneficial side effect in that it is an amorphous film. It does not have the crystalline metallic structure of MR film which means that it has very, very fine grains in it which allows the magnetization boundary between an opposite polarity of recording saturation level to be relatively clean and noise-free, so much so that the noise does not increase as the FCI, or flux changes per inch, or flux density increases. That is in opposition to the case with conventional metallic film media where transition noise or zigzag noise as it's commonly called, increases as the FCI increases, or flux density increases.

While MO media provides higher storage density and better reliability than MR media, MR systems are still widely used. This is partly attributable to the relatively slow data rate or the speed at which MO systems can record or retrieve data from the medium. Specifically, MR systems are able to handle more data per unit time, i.e. operate with a higher bandwidth efficiency compared to MO systems.

The difference in the system's bandwidth efficiency is primarily attributable to how the two systems communicate data to and from the storage medium. MO systems conventionally operate using standard saturation or binary level recording.

FIG. 1A shows the block diagram of a conventional MO system 100. The MO system consists of a digital recording channel 110 for receiving an input bit stream 101 and generating a recording signal therefrom, a MO medium 120 for storing the recording signal, and a digital playback channel 130 for reading the recording signal and generating an output bit stream 102. The recording channel 110 includes a binary encoder 111, a writing laser 113, and a magneto-optical recording head 114.

The MO system operates using standard two-level saturation recording technique whereby each received bit in the input bit stream 101 is encoded using a binary encoder 111. The resultant encoded waveform 112 is recorded onto the MO medium, bit by bit, by saturating the magnetic medium 120 to record a 1-bit, or by applying no magnetization to record a zero bit. Playback occurs bit by bit in the reverse order, using a playback head 131, a reading laser 132, an optical reader 134 and a binary decoder 136. Because the recording and playback-signals are digital, the recording and playback channels are not required to be highly linear.

Introduction

Linear Data Channels are known to have considerably larger data capacity than two-level channels of similar bandwidth and signal-to-noise ratio (SNR). For example, in conventional magnetic recording modeled as a Lorentzian channel in additive white Gaussian noise (AWGN) the capacity in bits per second (bps) is at least twice as large for the linear channel (average power constrained) over the saturation channel (peak power constrained). Both channels have the same bandwidth and signal-to-noise ratio (SNR). Consequently, there is considerable competitive advantage to develop a linear magnetic recording channel. Moreover, present-day known techniques in signal processing of the saturation channel are further from the their capacity bound than those known for the linear channel; consequently, the practical difference is larger than 2:1 in potential capacity.

AC-bias Linearization

The use of AC-bias to linearize the magnetic recording channel is not new. It has been successfully used to allow "write" equalization for 2-level recording on oxide media. However, when it comes to fully linearizing the channel, past investigators have been discouraged by the 6 dB to 7 dE SNR loss suffered in linearizing the magnetic recording channel with AC-bias. A loss this large is difficult to make up even with more efficient transmission techniques. FIG. 5 illustrates the problem with a conventional B-H loop (magnetic flux density, B, vs. magnetic field intensity, H). AC-bias removes the hysteresis leaving the zero-hysteresis line. Signal amplitude must be limited to the linear range of this curve. Recognition of this problem with conventional magnetic recording has led to efforts to find improved signaling efficiency by the composition of non-linear responses to produce a larger than two-character alphabet.

An example of a MR system utilizing linear recording is described in U.S. Pat. No. 5,124,861 to Shimotashiro. There, the system implemented quadrature amplitude modulation (QAM) to convert digital data into a QAM modulated signal. Because the modulated signal can be made to represent multiple bits, the data rate of the MR system is higher and bandwidth efficiency greater compared to the MO system.

To operate properly, MR systems requires high linearity and high signal-to-noise ratio (SNR) in the recording and playback channels. Linear channel operation in MR systems has been difficult to achieve primarily because of the properties of the MR medium. Conventional MR media possess a limited linear recording range. In addition, conventionally used MR media exhibits a gradual flux transition profile which creates a large amount of transition noise, degrading channel SNR. Thus, modulated signal recording has been limited.

To develop a suitable linearized channel with magneto resistive (MR) heads and thin film metal media would require significant effort to redesign the media to reduce its intergranular exchange coupling (for lower noise) and to increase its thickness. Greater thickness is required in longitudinal AC-bias recording to improve linear dynamic range. Multiple thin laminations of magnetic material separated by non-magnetic layers might be appropriate.

Therefore, what is needed is a MO recording system which uses linear recording techniques to increase the systems bandwidth efficiency. Further needed is a MO medium for use with the linear MO system which does not degrade channel linearity or SNR.

SUMMARY OF THE INVENTION

The invention provides a linear magneto-optical recording system having improved bandwidth efficiency. The magneto-optical recording system achieves improved bandwidth efficiency using a modulated recording signal, AC-bias recording, and a MO medium having a low inter-granular exchange coupling and abrupt flux transitions. A modulated recording signal allows the simultaneous" transmission of multiple bits per unit time through recording and playback channels. AC-bias recording increases channel linearity, reducing the overall system bit error rate (BER). The transition noise caused by the MO medium is minimized due to the low inter-granular exchange coupling and abrupt flux transition profile of the vertical recording on an amorphous medium.

In one embodiment of the invention, a magneto-optical recording system includes (1) a magneto-optical amorphous medium for storing a recording signal, (2) a linear recording channel coupled to the magneto-optical medium for receiving a plurality of supplied digital bits and for recording a linear signal representative of the plurality of digital bits onto a selected area of the magneto-optical medium, and (3) a linear playback channel coupled to the magneto-optical medium for sensing the recording signal on the selected area of the magneto-optical medium and for producing the plurality of digital bits in response thereto. Preferably, the BH loop of the amorphous medium is nearly square.

Under AC-bias the peak analog signal could closely approach the saturated signal level. This medium is also amorphous; it should have very little inter-granular exchange coupling. Consequently, noise should not be increased under the high flux transition density of the AC-bias operation.

Additional objects, features, and advantages of the various aspects of the present invention will become apparent from the following description of its preferred embodiments, the description of which should be taken in conjunction with the accompanying drawings.

BRIEF DESCRIPTION OF THE DRAWINGS

FIGS. 5B and 5C are perspective and sectional of the magneto-optical medium.

DESCRIPTION OF THE PREFERRED EMBODIMENT

Figure 1A:
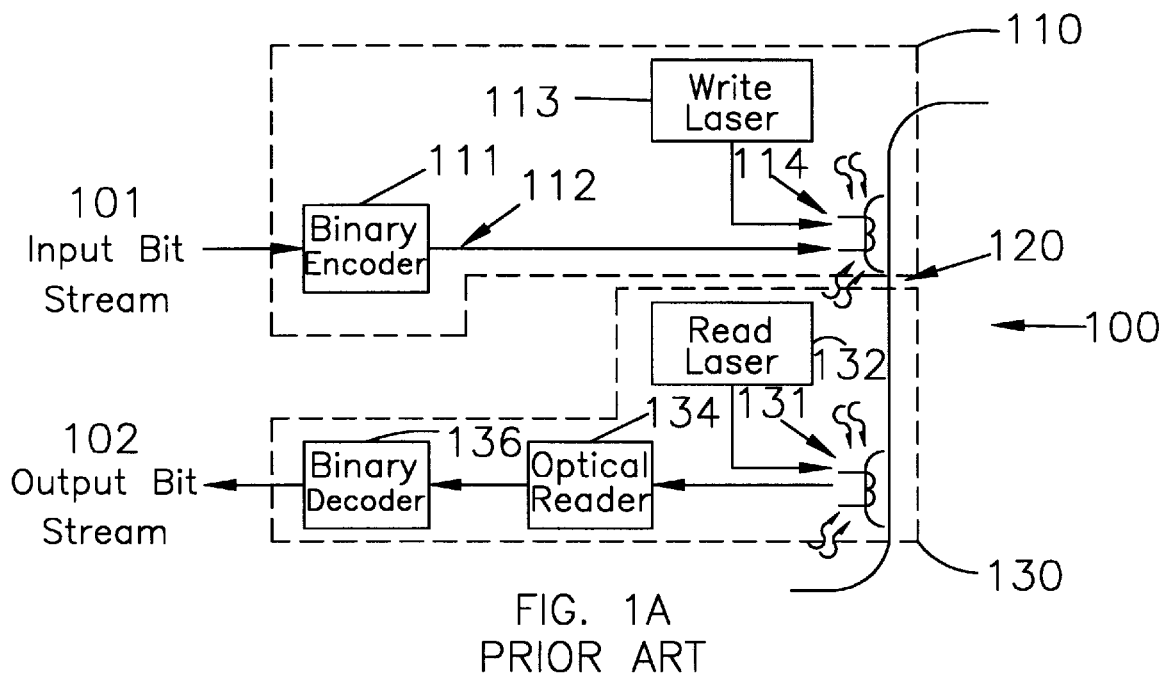
FIG. 1A shows the circuit block diagram of a conventional magneto-optical recording system.
Figure 1B:
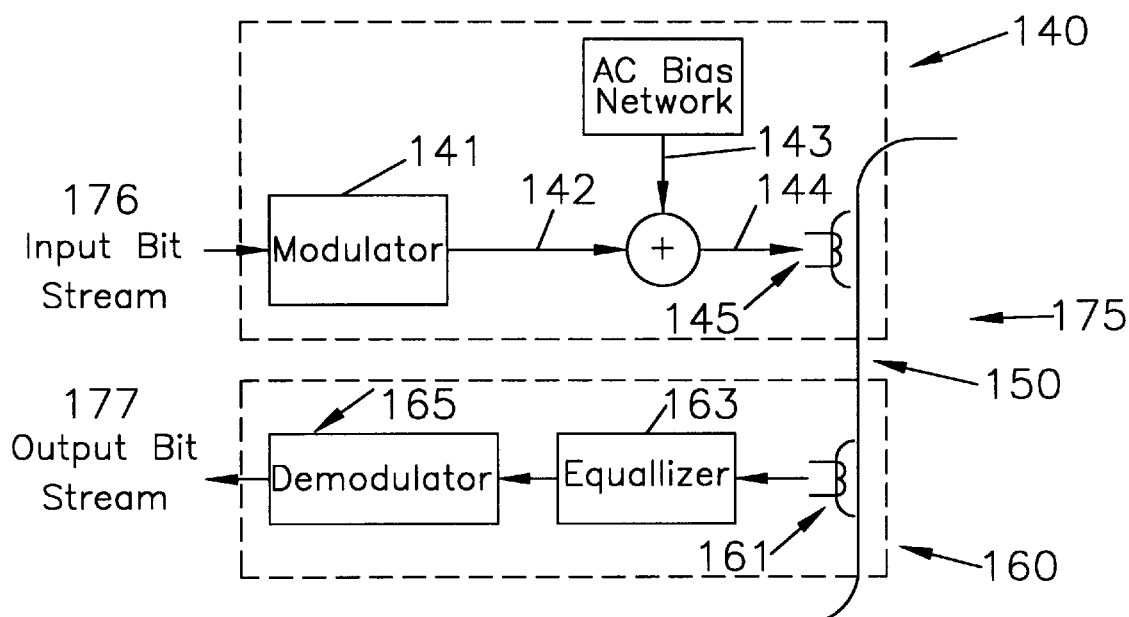
FIG. 1B shows the circuit block diagram of a conventional magnetic recording system.
Figure 2:
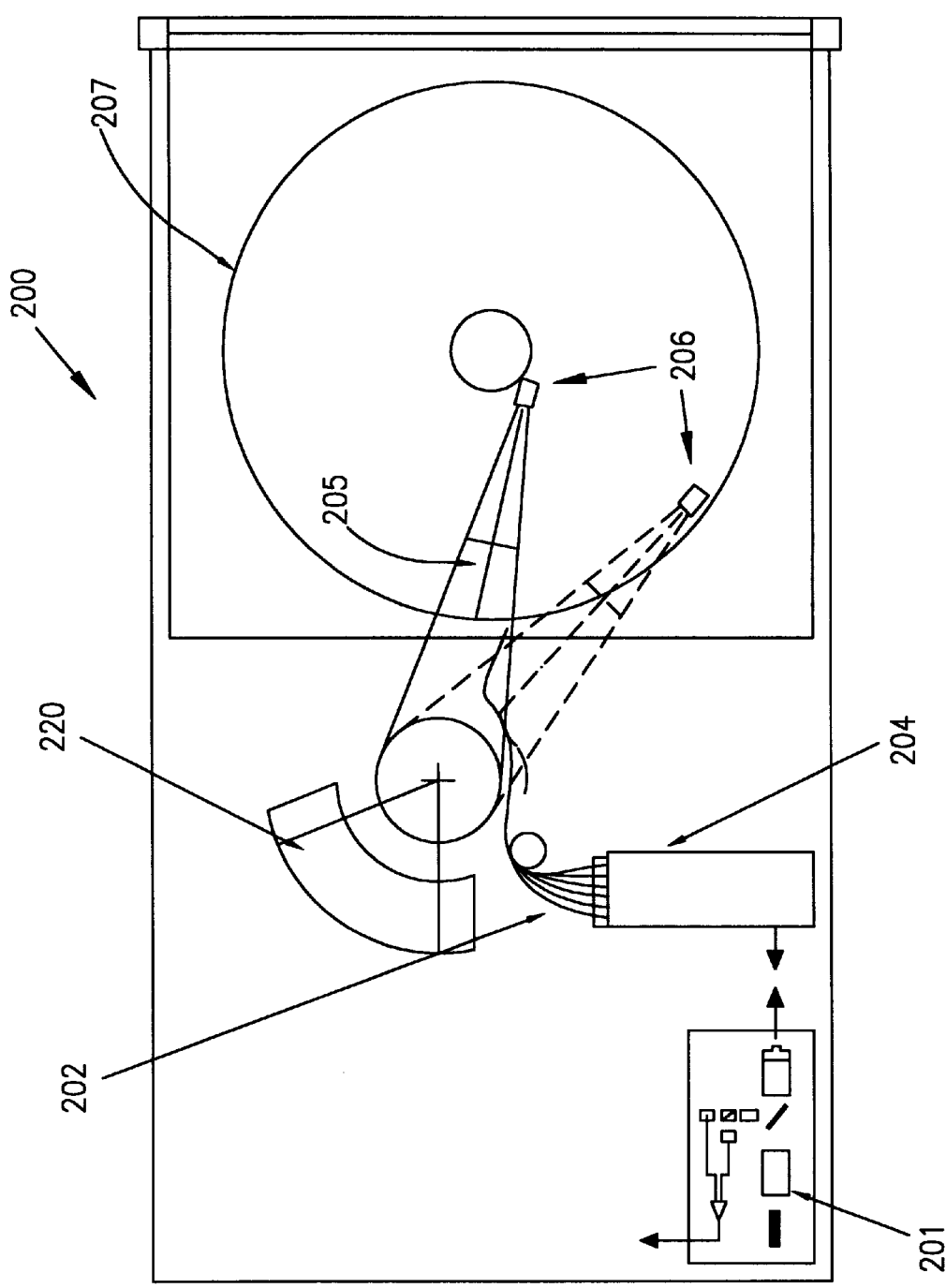
FIG. 2 shows a disk drive system in which the present invention is preferably implemented.

In the preferred embodiment of the present invention, the magneto-optical recording system is implemented in the computer disk drive system shown in FIG. 2. The disk drive system 200 includes a laser-optics assembly 201 connected to an optical switch 204. The optical switch 204 is coupled to Winchester-type flying heads 206 via single mode optical fibers 202. Dual Winchester-type flying heads 206 are supported and controlled by a rotary actuator magnet and coil assembly 220 and actuator arms 205. The Winchester-type flying heads 206 write data to and retrieve data from the MO disk 207 which is preferably doubled-sided to maximize the systemic storage capacity.

The present invention is not limited to the computer disk drive system 200 of FIG. 2, and is equally applicable to other MO recording systems such as audio/video digital systems such as DAT and DVD.

Figure 3:
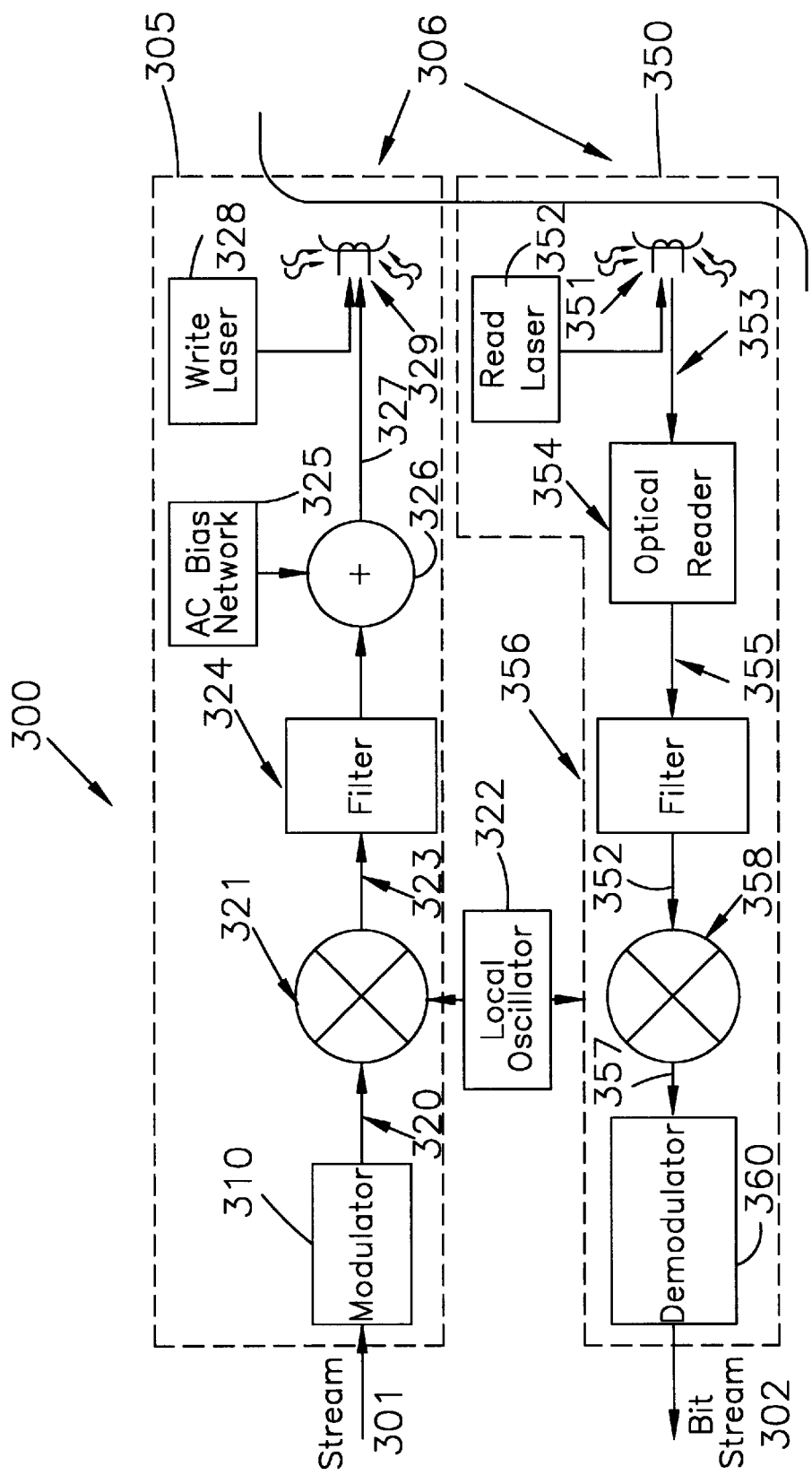
FIG. 3 shows the circuit block diagram of the magneto-optical data recording system in accordance with the present invention.

FIG. 3 is a circuit block diagram of the MO recording system in accordance with the present invention. The MO recording system 300 includes a recording channel 305 and a playback channel 350 through which data propagates during data storage and retrieval operations. The recording which closely matches the pulse-width modulated particle train 515 imprinted on the MO medium.

As is well known, a pulse-modulated waveform can be demodulated by low-pass filtering. According, the low-pass filter 356 demodulates the pulse-width modulated waveform 525 into the playback signal 357, wherein the playback signal 357 closely matches the modulation signal 323 prior to AC-bias modulation. The playback signal 357 is subsequently demodulated as described above, resulting in an output stream which closely matches the original input bit stream.

Transmission Efficiency

In disk storage the effectiveness of a data channel is measured by its contribution to areal density. The performance surface of any data channel is defined in the three dimensions of $SNR_i$, BER (bit error rate or error probability), and $D_u$. User density is defined as:

$$D_u = T_{50}/T, \quad (1)$$

where $T_{50}$ is the half-amplitude pulse-width channel response and T is the user bit period. The contribution of the data channel to areal density is:

$$A_{R/W} = \frac{D_u}{SNR_i} \quad (2)$$

where SNR, is the lowest possible input SNR required to achieve the specified BER with the highest possible user density, $D_u$, for the channel under investigation.

User density, $D_u$, in the mass storage terminology is synonymous with bandwidth efficiency, η, in communications terminology as follows:

$$bps = 1/T, \quad (3)$$

where bps is the data rate in bits per second, and $$BW \alpha 1/T_{50}, \quad (4)$$

where BW is the bandwidth in Hertz.

In communications, bandwidth efficiency:

$$\eta = bps/BW, \quad (5)$$

and from (3), (4), (5), and (1)

$$\eta \alpha D_u. \quad (6)$$

For saturation data channels in mass storage an average user density of 1.5 is achievable for a well-equalized peak-detector channel, and for a PRML channel 2.0 to 2.2 is reasonable. For linear channels in communications the bandwidth efficiency or user density of a typical modem is:

$$\eta = \frac{28.8 \text{ Kbps}}{3.5 \text{ KHz}} = 8.2 \, \alpha D_u. \quad (7)$$

This is almost a 4:1 improvement over PRML in saturation channels.

The transmission system used in the linear channel communications is quadrature-amplitude-modulation (QAM). QAM is a transmission system in which a sinusoidal carrier is simultaneously modulated in amplitude and phase to an integer number of combinations forming a constellation of points on the complex plane of in-phase and quadrature-phase coordinates. By using a large constellation, trellis code, and forward error correction (FEC) the system achieves close to the maximum theoretical capacity.

The idea of using some form of QAM with an AC-bias linearized magnetic recording data channel has been considered before. The issue of SNR loss relative to saturation recording has prevented commercialization of the idea and its application to MR storage. The extreme squareness of a particular MO media, its vertical magnetic orientation, and low noise enables application to optical data storage. With similar changes to conventional magnetic recording media it should be possible to accomplish the same improvements.

There is an extremely attractive opportunity to profitably advance the state-of-the-art in optical mass storage data channels. The technique of AC-bias should linearize the channel with no SNR loss enabled by selection of appropriate MO media having an extremely square "B-H" loop. Coupled with the appropriate QAM system, and dependent upon SNR, a first generation system might achieve about a 2:1 improvement in lineal density.

The above is a complete description of the preferred embodiments of the invention. However, various alternatives, modifications, and equivalents will be evident to those skilled in the art. The scope of the present invention includes these alternatives, modifications and equivalents, and is defined by the metes and bounds of the appended claims.

The Recording Channel

The recording process will now be explained in greater detail with reference to FIG. 3. Initially an input bit stream 301 is received at the modulator 310. A predetermined number of the received bits are grouped into a block and transformed into a modulated signal 320, the process of which will be described in greater detail below. Amplitude, phase, frequency, or spread spectrum modulation techniques may be used to transform the selected bits into a modulated signal 320. Further, conventionally known error correction coding techniques, such as Tomlinson-Harashima precoding may be implemented to further enhance the system's performance.

The modulated signal 320 is fed into a mixer 321 along with a mixing tone generated by a local oscillator 322. The mixer produces a frequency shifted version of the modulated signal 320. In the preferred embodiment, the frequency of the local oscillator is selected so that the mixer output watches the optimum recording frequency of the MO medium used. Alternatively, if the modulated signal operates with a frequency at or near to the MO medium's optimum recording frequency, implementation of the mixer 321 and the local oscillator 322 becomes unnecessary.

The frequency-shifted modulated signal 323 is fed through a filter 324 implemented between the modulator 310 and the subsequent circuits to isolate any intermodulation and harmonic signals produced by the modulator-10 and the mixer 321. Using a summer 326, the frequency-shifted modulated signal 323 is added to an ac bias signal generated from an ac bias network 325. As is well known in the art, the addition of an ac bias signal to a recording signal further linearizes the magnetic recording channel. The amplitude of the ac bias signal is selected to be much greater than the amplitude of the modulating signal to be recorded, as is known in the art. Thus, the recording signal 327 consists of the information to be recorded in modulated form and shifted to-the optimum recording frequency combined with an ac bias signal.

During recording, a write laser 328 illuminates a selected surface area of the MO medium 330. The beam illuminating the selected area in of a sufficient wavelength and intensity that the area reaches its curie temperature point. As a result,-the ferro magnetic particles embedded within the illuminated area exhibit low coercivity and the particle's polarity may be re-oriented if a magnetic field is applied in close proximity thereto. Once the selected area has reached its curie temperature point, the recording signal 327 is magnetically induced onto the MO medium 330 by conducting the recording signal 327 through the recording head 329 held in close proximity to the MO medium 330. The polarity of a ferro-magnetic particles within the MO medium 330 are re-oriented according to amplitude of the recording signal~327 applied an will be discussed in greater detail below. Once the selected area falls below its curie temperature point, the ferro-magnetic particles will again exhibit a high coercivity to an applied magnetic field, retaining the induced recording signal 327.

The Playback Channel

During playback, a reading laser 352 generates a beam for illuminating a selected surface area of the MO medium 330. A playback head 351 includes optics to direct the beam to selected area. The beam intensity of the reading laser 352 is set low so as not to heat the illuminated area to it curie point temperature. In the preferred embodiment, the write laser 328 and reading laser 352 comprise the same laser which operates at a higher intensity during the recording operation and at a lower intensity during the playback operation. Further preferred, is a single magneto-optical head which is used during both the recording and playback operations. The laser and magneto-optical recording/playback head components are described in their preferred embodiments in the pending U.S. Patent Application to be assigned, filed.

When the reading laser 352 illuminates an area having magnetic particles of a particular polarization, its beam undergoes a polarization shift. An optical reader 353 receives the reflected beam and comparer its polarization with the incident beam. If the reflected beam exhibits a polarization shift indicating a change in the polarity of the illuminated ferro-magnetic particles, the optical reader outputs a positive or zero amplitude pulse. Pulse amplitudes are continuously generated, resulting in a pulse-width modulated waveform 355, described in greater detail below.

The pulse-width modulated waveform 355 is transmitted through a low-pass filter 356 and into a mixer 358. The low-pass filter 356 isolates the playback components 351, 352, and 353 from the intermodulation and harmonic signals produced by the local oscillator 322, the mixer 358 and demodulator 360. Additionally, the low-pass filter 356 demodulates the pulse-width modulated waveform 355 to a playback signal 357 which closely matches the modulating signal 323 as will be described in greater detail below. The local oscillator 322 supplies a mixing tone to the mixer 358 to frequency shift the playback signal 357 to a frequency which the demodulator can accept. As before, if the playback signal 357 operates at an acceptable demodulator frequency, implementation of the mixer 358 and local oscillator 322 becomes unnecessary.

The frequency-shifted playback signal 359 is fed into the demodulator 360 where information contained within the modulated signal is converted into a group of digital bits as originally received into the modulator 310. Bit groups are output sequentially forming a digital output stream 302. Additionally, conventionally known decoding algorithms, such as Viterbi decoders may be used to further enhance the system's performance.

The Modulator and Demodulator

Digital data is modulated and demodulated in a conventional manner using known modulation and demodulation techniques, some examples of which being QAM, CDMA, or FDMA In the preferred embodiment, FIG. 4, the modulator 310 is a 256-bit QAM modulator such as model number manufactured by the Broadcom Corporation of Los Angeles, Calif. In this embodiment, the QAM modulator consists of a symbol mapper 311, two digital-to-audio converters (DACs) 312, two linear predictive filters 313, an I-channel mixer 314 and frequency source 315, a Q-channel mixer 316 and frequency source 317, and an output mixer 318.

Figure 4A:
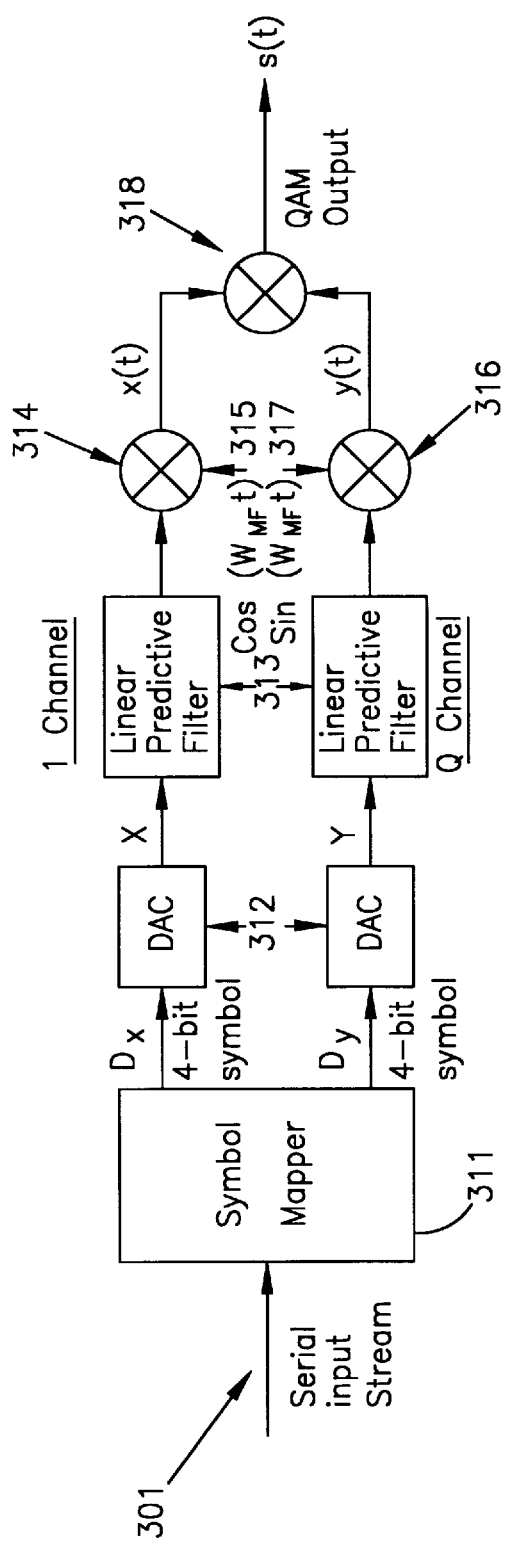
FIG. 4A shows one embodiment of the modulator circuit in accordance with the present invention.

Referring now to FIG. 4A, the QAM modulator receives the serial input stream 301, a group of which the modulator selects for input into the symbol mapper 311. In the preferred embodiment, the symbol mapper 311 is a trellis coder known in the art. The symbol mapper 311 receives data in 8-bit blocks, subsequently parsing each 8-bit block into two 4-bit symbols, Dx and Dy. As discussed above, conventionally known preceding techniques may be additionally implemented to further improve the system's performance.

The 4-bit symbols Dx and Dy are applied to the DACs 312. The DACs 312 convert the 4-bit symbols Dx and Dy into I and Q-channel analog signal having amplitude levels X and Y, respectively, wherein X and Y are each one of 16 possible amplitude levels defined by the 4-bit symbols Dx and Dy. If needed, linear predictive (Nyquist) filters 313 provide harmonic and out-of band signal rejection with minimal spectral distortion of the analog signals.

Subsequently, the I and Q-channel analog signals are applied to frequency mixers 314 and 316. I and Q-channel local oscillators 315 and 317 generate mixing tones at the desired modulation frequency WM 90 degrees out of phase with each other. In an alternative embodiment, a single local oscillator having an output frequency of WMF is used in combination with a signal splitter and a 90 degree phase shifter to supply the in-phase and quadrature phase mixing tones. The outputs of the I and Q-channel frequency mixers 314 and 316 are described by the equations:

(1) $x(t)=X \cos(\sim wMFt)$ (2) $y(t)=Y \sin(\sim wMFt)$ where X and Y are the I and Q-channel amplitude levels generated by the DACs 313 and~MF is the desired modulation frequency. A summer 318 is used to combine the quadrature components to complete the QAM signal s(t):

(3) $s(t)=X \cos(WMFt)+Y \sin(wMFt)$

Since each of the amplitude levels X and Y can represent 16 different values, the QAM signal s(t) can be used to communicate 256 data points within a particular time period. It is readily understood that the quadrature components as described by equations (1) and (2) above may not be of the same sign.

Figure 4B:
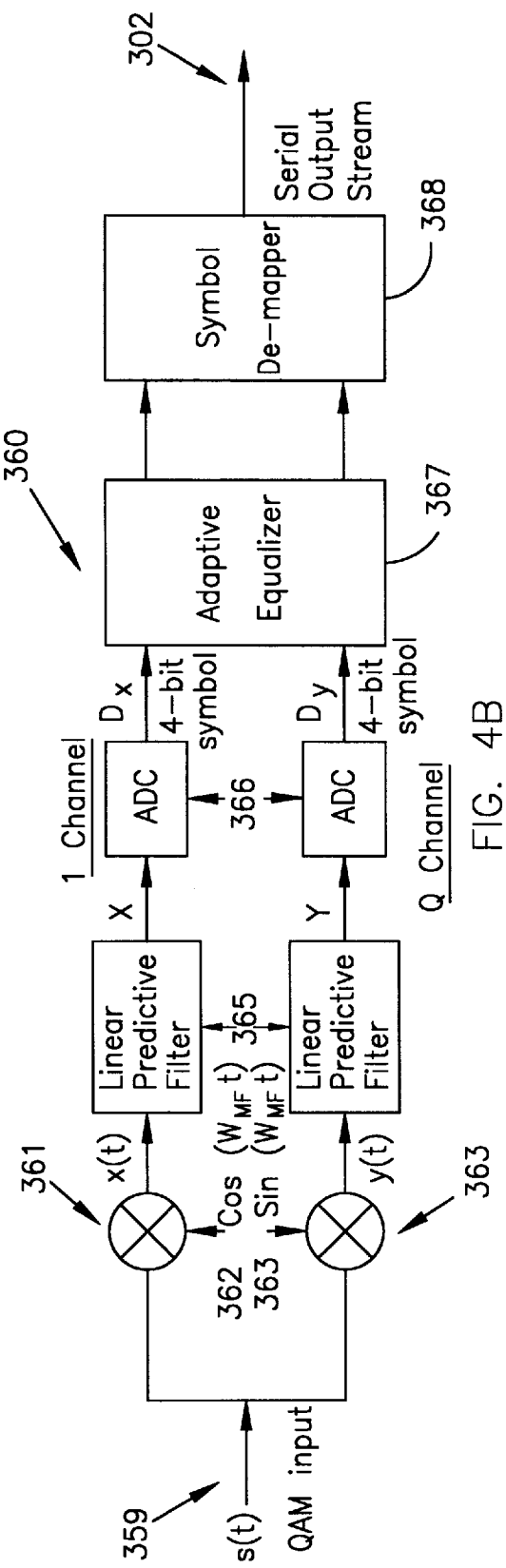
FIG. 4B shows one embodiment of the demodulator circuit in accordance with the present invention.

FIG. 4B shows a circuit block diagram of a matching 256-bit QAM demodulator, an example of which is model number BCM3100~manufactured by the Broadcom Corporation of Los Angeles, Calif. The QAM demodulator 360 essentially performs the inverse function" of the QAM modulator to recover the originally recorded 8-bit block. The QAM demodulator 360 includes I and Q-channel frequency mixers 361 and 363, local oscillators 362 and 364, linear predictive filters 365, analog-to-digital converters (ADC8) 366, an adaptive equalizer 367, and a symbol demapper 368.

In operation, the QAM demodulator 360 receives the QAM modulated signal s(t) defined in equation 3. This signal is split and fed to the I and Q-channel frequency mixers 361 and 363. I and Q-channel local oscillators 362 and 364 generate mixing tones at the modulation frequency WMF~90 degrees out of phase with each other. As indicated above, a single local oscillator, a signal splitter, and a 90 degree phase shifter can alternatively be used to supply the in-phase and quadrature phase mixing tones. Frequency mixing the QAM modulated signal with the originally applied local oscillator tones produce" analog signals on the I and Q-channels having amplitudes X and Y, respectively. Linear predictive filters 365 provide out-of-band signal rejection with minimal distortion to the desired signal.

The I and Q-channel analog signals having amplitudes X and Y are applied to the analog-to digital converters (ADCs) 366. The I-channel ADC convert" the X level amplitude of the I-channel analog signals to a 4-bit symbol Dx, and the Q-channel ADC converts the Y amplitude level of the Q-channel analog signal to a 4-bit symbol Dy.

The 4-bit symbols DX and Dy are fed into an adaptive equalizer 367. The adaptive equalizer 367 has an output response which is inverse to the channel frequency response, thus correcting for any channel distortion that occurs thereover. The equalized 4-bit symbols DX and Dy are subsequently applied to a symbol demapper 368 which reassembles the quadrature 4-bit words into the 8-bit block as originally transmitted. In the preferred embodiment, the symbol demapper is a Viterbi decoder known in the art. The 8bit blocks are outputted sequentially, forming a data bit stream 302.

The Magneto Optical Medium

The MO medium used in the present invention is conventionally known as amorphous, rare-earth transition metal alloys having low inter-granular exchange couplings and a perpendicular magnetic aniosotropy. A low inter-granular exchange coupling and abrupt flux transition of the MO media used produces minimal transition noise when large amplitude, high frequency signals are used in the "write" process. A perpendicular magnetic an isotropy is preferred over the horizontal particle orientation commonly used in MR systems since the vertical particle orientation reduces the self-demagnetization fields between ferro-magnetic particles enabling greater storage density.

Figure 5A:
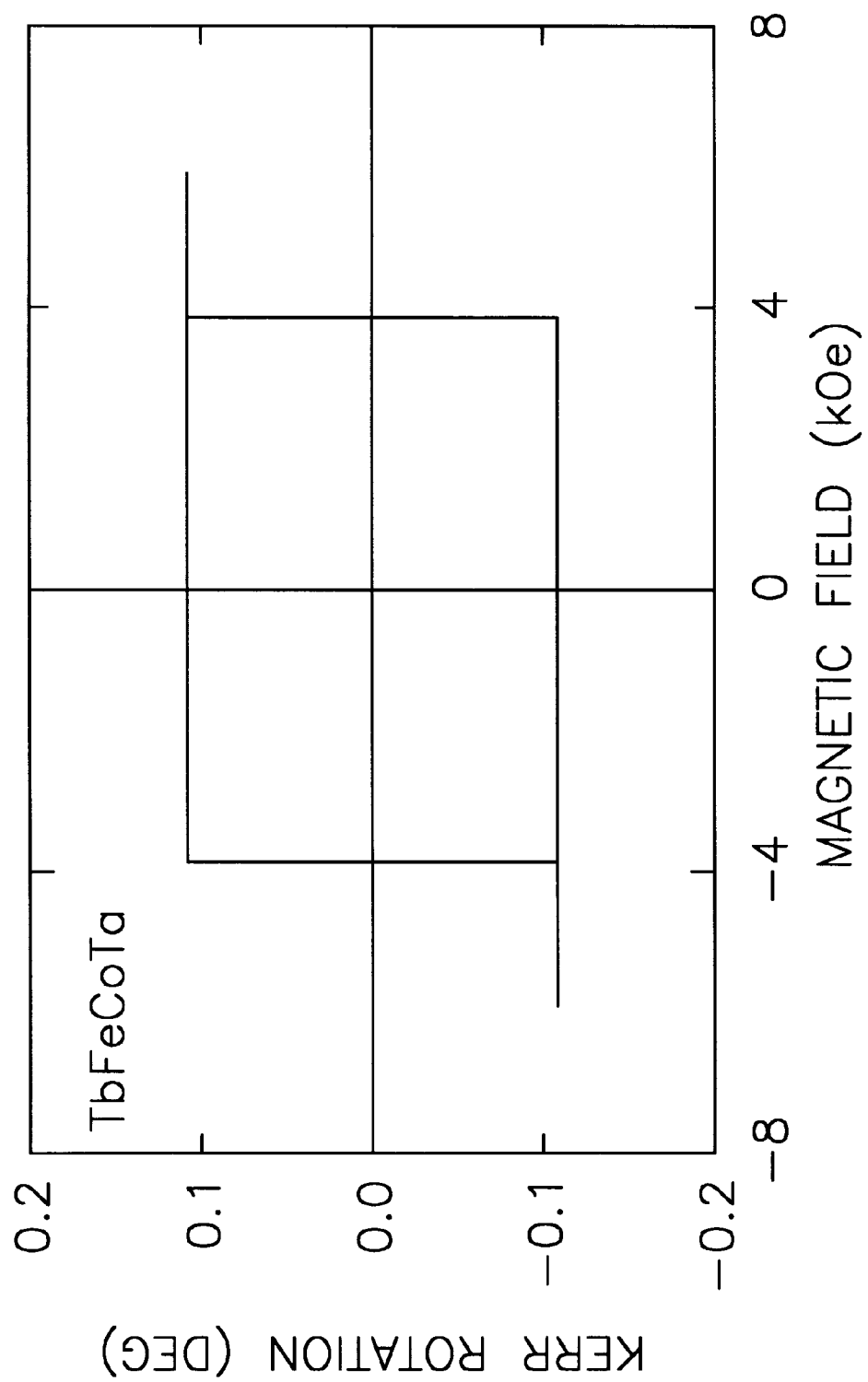
FIG. 5A shows characteristics of one embodiment of the magneto-optical medium used in accordance with the present invention.

Further preferred is the use of conventionally known materials, such an TbFeCoTa, which exhibit substantially a rectangular Kerr rotation and magnetic flux versus magnetic field strength hysteresis as shown in FIG. 5A. This substantially rectangular hysteresis response allows pulsewidth modulation encoding of the modulated signal onto the MO medium as will be described below.

FIGS. 5D and 5C illustrates one embodiment of the MO medium used in the present invention. In the preferred embodiment of FIG. 5C, the MO medium is illustrated as a disk, but other forms such as magnetic tape are possible. The MO disk 400 includes recording and storage surfaces 420 and 450 and a substrate 430 disposed therebetween. In an alternative embodiment, the MO medium has a single recording/storage surface.

Data Recording and Playback

Figure 6:
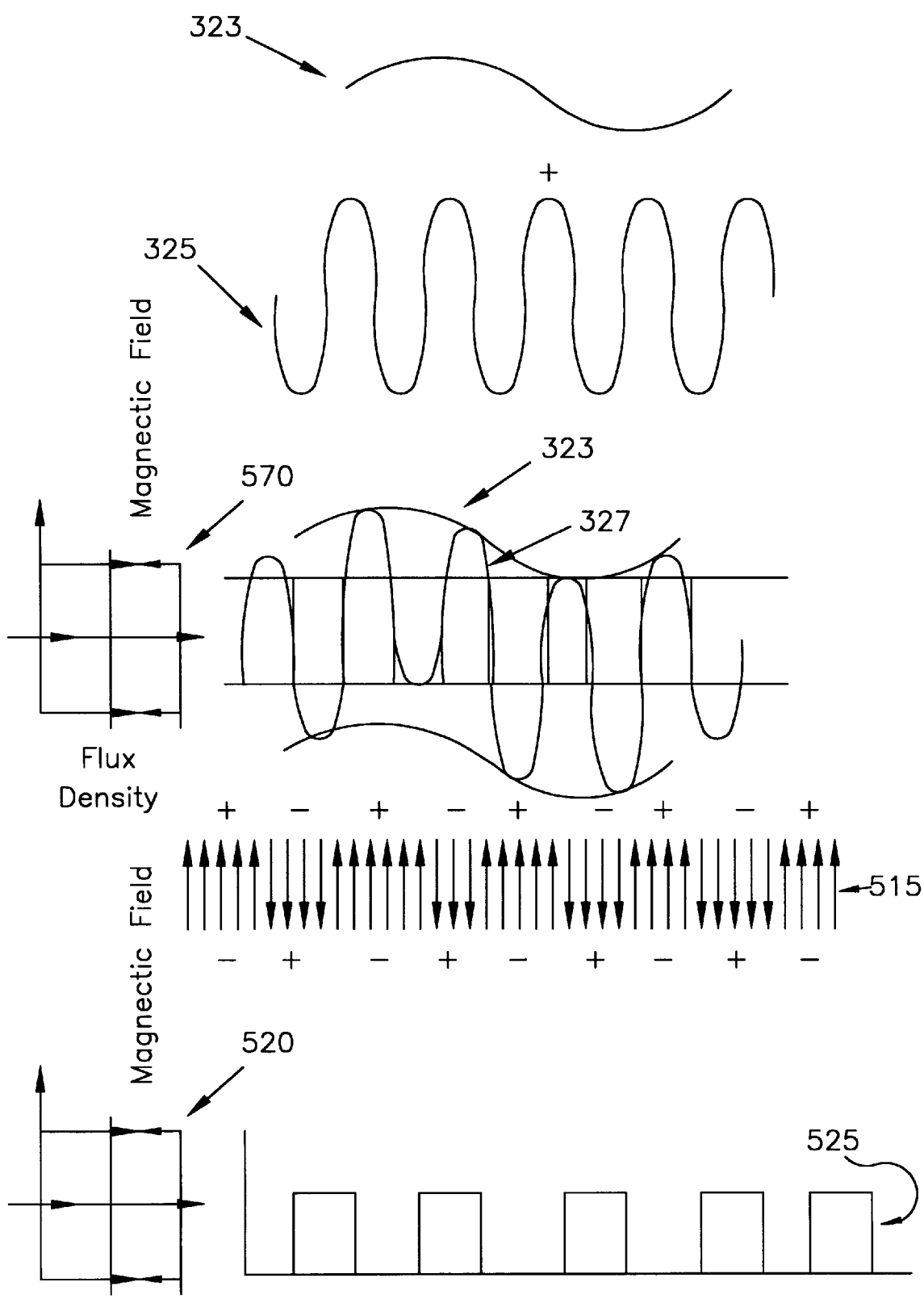
FIG. 6 shows the waveforms and ferro-magnetic particle orientation generated during recording and playback operations in accordance with the present invention.

Now referring to FIG. 6, data recording and playback operations will be explained in greater detail. During recording, the modulated signal 327 is modulated with the ac bias signal 325 which operates with a much greater amplitude and frequency of operation. Modulating the ac bias signal with the modulating signal 323 results in the recording signal 327 having the frequency of the ac bias signal frequency with an amplitude envelope defined by the modulating signal 327.

Before recording, the MO recording medium is heated to its curie temperature point as described above. The recording signal 327 is subsequently conducting through the recording head 329 (FIG. 3) held in close proximity to the medium, thereby exposing the MO medium to the time varying amplitude of the recording signal 327 by magnetic induction. The MO medium has a flux density versus magnetic field hysteresis response 510 as described above. Specifically, when the MO medium is exposed to a positive magnetic field in access of X Oe, the exposed particle will orient itself in the top positive magnetic orientation as shown in 515. When the ferro-magnetic particle in the illuminated area is exposed to a negative magnetic field whose magnitude is greater than —X Oe, the particle orients itself in the bottom positive orientation. In this manner, the recording signal 327 imprints the particle pulse train 515 onto the MO medium.

The particle pulse train 515 can be seen as a sampled version of a pulse-width modulated waveform, wherein all of the similarly oriented ferro-magnetic particles make up one pulse. As can be seen, the width of each positive and negative going pulse is directly proportional to the amplitude of the recording signal 327.

During playback, the playback head focuses a beam onto a selected surface area of the MO medium as described above. As the beam illuminates the ferro-magnetic particle within the selected area, the reflected light undergoes a Kerr rotational shift as defined by graph 520. Specifically, a ferro-magnetic particle having a top positive magnetization field of greater than X Oe will rotate the illuminating beam Y degrees. A ferro-magnetic particle having a the reverse polarity and an equal or greater magnitude of magnetization will rotate the illuminating beam —Y degrees.

The rotational shifts in the reflected beam are detected by comparing the polarization of the reflected light to the incident light. Detected rotations generate either a positive or zero pulse amplitude. In this manner, a pulsewidth modulated pulse train 525 is constructed electronically which closely matches the pulse-width modulated particle train 515 imprinted on the MO medium.

As is well known, a pulse-modulated waveform can be demodulated by low-pass filtering. According, the low-pass filter 356 demodulates the pulse-width modulated waveform 525 into the playback signal 357, wherein the playback signal 357 closely matches the modulation signal 323 prior to ac bias modulation. The playback signal 357 is subsequently demodulated as described above, resulting in an output stream which closely matches the original input bit stream.

The above is a complete description of the preferred embodiments of the invention. However, various alternatives, modifications, and equivalents will be evident to those skilled in the art. The scope of the present invention includes these alternatives, modifications and equivalents, and is defined by the metes and bounds of the appended claims.

What is claimed is:

1. A magneto-optical recording system comprising:

a magneto-optical medium for storing a recording signal;

a linear recording channel coupled to said magneto-optical medium for receiving a plurality of supplied digital bits and for recording through a linearized channel a representative of said plurality of digital bits onto a selected area of said magneto-optical medium; and a linear playback channel coupled to said magneto-optical medium for sensing said recording signal on said selected area of said magneto-optical medium and for producing said plurality of digital bits in response thereto, said linear recording channel comprising a modulator coupled to said digital source for converting said plurality of digital bits into said recording signal, said linear recording channel further comprising a channel linearizer such as an AC bias circuit coupled to said modulator, said modulator converting said plurality of digital bits into a modulating signal and said channel linearizer such as an ac bias circuit for converting said modulating signal to a recording signal, said modulator comprising a quadrature amplitude modulator, said linear playback channel further comprising:

said laser for emitting an incident beam onto said selected area:

an optical reader for detecting a reflected beam from said selected area, for comparing the polarization of said incident beam to the polarization of said reflected beam, and for generating an output waveform in response to said comparison, said demodulator coupled to said optical reader for converting said output waveform to said plurality of digital bits, and said demodulator comprising a quadrature amplitude demodulator.

2. The magneto-optical recording system of claim 1, wherein said linear recording channel further comprises: a laser for heating a selected area of said magneto-optical medium; and a recording head coupled to said channel linearizer such as an AC bias circuit for magnetically inducing said recording signal onto said selected area of said magneto-optical medium.

3. The magneto-optical recording system of claim 1, wherein said magneto-optical medium comprises a recording medium having a substantially rectangular magnetic flux versus magnetic field intensity hysteresis characteristic and a substantially rectangular Kerr rotation versus magnetic field intensity hysteresis characteristic.

4. The magneto-optical recording system of claim 3, wherein said magneto-optical medium comprises a recording medium having a substantially abrupt flux transition.

5. A magneto-optical disk drive system comprising: a magneto-optical medium for storing a recording signal, wherein said magneto-optical medium exhibits a substantially rectangular magnetic flux versus magnetic field intensity hysteresis characteristic and a substantially rectangular Kerr rotation versus magnetic field intensity hysteresis characteristic; a recording channel comprising:

a modulator coupled to said magneto optical medium for receiving a plurality of supplied digital bits and for converting said plurality of digital bits into a modulating signal;

a channel linearizer such as an AC bias circuit coupled to said modulator for converting said modulating signal to a recording signal, said modulator comprising a quadrature amplitude modulator;

a first laser for heating a selected area of said magneto-optical medium;

a recording head coupled to said channel linearizer such as an AC bias circuit for magnetically inducing said recording signal onto said selected area of said magneto-optical medium; and a playback channel comprising:

said first laser for emitting an incident beam onto said selected area containing said recording signal;

an optical reader for detecting a reflected beam from said selected area, for comparing the polarization of said incident beam to the polarization of said reflected beam, and for generating an output waveform in response to said comparison; and a demodulator coupled to said optical reader for converting said output waveform to said plurality of digital bits said demodulator-comprising a quadrature amplitude demodulator.

* * * * *